United States Patent [19]

Wright

[11] Patent Number: 4,501,713

[45] Date of Patent: Feb. 26, 1985

[54] STABILIZING MELT CRYSTALLIZATION TEMPERATURE IN ARYLENE SULFIDE POLYMER HEAT TREATMENT

[75] Inventor: Roy F. Wright, Bartlesville, Okla.

[73] Assignee: Phillips Petroleum Company, Bartlesville, Okla.

[21] Appl. No.: 504,543

[22] Filed: Jun. 15, 1983

[51] Int. Cl.³ .............................................. B29B 3/00
[52] U.S. Cl. ................................ 264/176 R; 264/126; 264/235; 264/322; 264/345; 264/346; 264/DIG. 65; 528/388
[58] Field of Search ...................... 264/210.5, 235, 345, 264/346, 126, DIG. 65, 322, 176 R; 528/388

[56] References Cited

U.S. PATENT DOCUMENTS

| | | | |
|---|---|---|---|
| 1,005,360 | 10/1911 | Taylor | 338/251 |
| 1,705,696 | 3/1929 | Woodson | 338/248 X |
| 2,425,088 | 8/1947 | Dean | 338/254 X |
| 2,615,111 | 10/1952 | Paquette et al. | 83/170 |
| 2,859,321 | 11/1958 | Garaway . | |
| 2,863,036 | 12/1958 | Mitchell et al. | 30/140 |
| 2,866,068 | 12/1958 | Bernstein | 30/140 X |
| 3,010,007 | 11/1961 | Theodore et al. | 219/544 X |
| 3,524,835 | 8/1970 | Edmonds et al. | 528/388 |
| 3,562,199 | 2/1971 | Hill, Jr. et al. | 264/346 |
| 3,699,087 | 10/1972 | Wood et al. | 528/388 |
| 3,725,362 | 4/1973 | Walker | 528/388 |
| 3,793,256 | 2/1974 | Scoggin | 528/388 |
| 3,898,204 | 8/1975 | Short et al. | 264/347 |
| 3,912,695 | 10/1975 | Short et al. | 528/388 |
| 3,922,386 | 11/1975 | Ros . | |
| 3,929,708 | 12/1975 | Brady et al. | 264/211 |
| 4,056,594 | 11/1977 | Carrow | 264/176 R |
| 4,321,358 | 3/1982 | Zelinski | 528/388 |
| 4,369,779 | 1/1983 | Spencer | 604/408 |
| 4,370,471 | 1/1983 | Salmon | 528/388 |

FOREIGN PATENT DOCUMENTS

| | | | |
|---|---|---|---|
| 596140 | 7/1959 | Italy | 156/251 |
| 53-64260 | 6/1978 | Japan | 264/345 |

OTHER PUBLICATIONS

"Thermofoil Heat Fusers", Bulletin TF-5, revised Mar. 1975, Minco Products Inc., Minneapolis, Minnesota.
"Thermofoil Heaters", Bulletin TF-4, revised Aug. 1973, Minco Products Inc., Minneapolis, Minnesota.

*Primary Examiner*—Jeffery Thurlow
*Attorney, Agent, or Firm*—A. W. Umphlett

[57] ABSTRACT

A method for stabilizing the $T_{mc}$ of PPS subjected to heat treatment in a temperature range between 240° C. and 320° C., particularly during the heating process of an extrusion operation, by increasing the tmperature of the polymer through the 240° C.–320° C. range at a rate of at least 20° C. per minute or by subsequently raising the temperature of the polymer to at least 350° C. for a time sufficient to stabilize the $T_{mc}$ of the polymer.

9 Claims, No Drawings

STABILIZING MELT CRYSTALLIZATION TEMPERATURE IN ARYLENE SULFIDE POLYMER HEAT TREATMENT

BACKGROUND OF THE INVENTION

This invention relates to poly(arylene sulfide). In one of its aspects this invention relates to phenylene sulfide polymers. In another of its aspects this invention relates to heat treatment of arylene sulfide polymers. In another of its aspects this invention relates to extrusion of arylene sulfide polymers. In still another aspect of this invention it relates to stabilization of melt crystallization temperature of arylene sulfide polymers.

Melt crystallization temperature (Tmc) is an important characteristic in the determination of final use of poly(arylene sulfide), particularly poly(phenylene sulfide). The melt crystallization temperature (Tmc) indicates the point at which the polymer becomes crystalline. Tmc is an important characteristic of poly(phenylene sulfide) that is to be used in fiber and film making, e.g., the lower the Tmc of the polymer: the thicker film that can be formed from the polymer.

It is well known that subjecting poly(phenylene sulfide) to treatment requiring elevation of temperature can cause an increase in the melt crystallization temperature. It has now been further determined that for PPS there seems to be a critical range of temperature between 260° and 320° C. within which the slow heating process usually used in elevating the temperature of the polymer is particularly detrimental in increasing the Tmc.

The process of the present invention sets forth a method by which the increase in Tmc that often appears in poly(phenylene sulfide) treated by elevating the temperature of the polymer through a temperature range of up to about 320° C. can be at least alleviated if not completely overcome.

It is therefore an object of this invention to provide a method for minimizing the increase of Tmc in poly(phenylene sulfide) subjected to heat treatment in a range of temperature up to about 320° C. It is still another object of this invention to provide specific temperature treatments for an extrusion process in which the temperature of the polymer is raised through a temperature range between about 240° C. and about 320° C. It is still another object of this invention to produce heat treated poly(phenylene sulfide) without adversely raising the Tmc of the polymer. It is still another object of this invention to subject poly(phenylene sulfide) to an extrusion without raising the Tmc of the polymer.

Other aspects, objects and the various advantages of this invention will become apparent upon reading the specification and the appended claims.

STATEMENT OF THE INVENTION

In accordance with this invention a method is provided for minimizing increase of Tmc in poly(phenylene sulfide) subjected to a heat treatment in a range of temperature of up to about 320° C. The method entails heating the PPS at a rate of temperature increase in a range of at least 20° C. per minute in the range of temperature between 240° C. and 320° C.

In another embodiment of the invention a method for minimizing increase of Tmc in poly(phenylene sulfide) subjected to heat treatment in a temperature range up to about 320° C. is provided in which the temperature of the PPS is further raised above at least 350° C. and maintained at this higher temperature level for a time sufficient to minimize increase of Tmc of the treated product.

It can be ascertained from the two embodiments above that if the temperature of PPS is increased through the range of about 240° C. to about 320° C. at a rate of less than about 20° C. per minute that an increase in the Tmc will result. The invention can, therefore, be stated as a method for alleviating an increase of Tmc caused by a slow heating rate as just described with the method for alleviating the increased Tmc entailing further raising the temperature above about 350° C. and maintaining this elevated temperature for a time sufficient to alleviate the increased Tmc.

The invention can be further described in embodiments specifically directed to stabilizing the melt crystallization temperature of PPS while the polymer is subjected to an extrusion process. Among the methods for minimizing the increase of Tmc in PPS during the process of extrusion are (1) maintaining the temperature of at least the inlet zone of the extruder at a temperature within a range sufficiently elevated that the temperature of the polymer increases at a rate in a range of at least 20° C. per minute as it passes through the temperature range between 240° C. and 320° C., (2) in addition to the process set out in step (1) preheating the poly(phenylene sulfide) in a preheating zone to a temperature in a range of about 220° C. to about 260° C. prior to entry into the inlet zone, and (3) maintaining at least one zone of the extruder at a temperature sufficiently elevated that the temperature of the polymer is raised to a temperature above at least 350° C. and maintained at this temperature for a time sufficient to stabilize the Tmc of the polymer.

The poly(arylene sulfide) resins, often abbreviated PAS, contemplated in the compositions of this invention include those described in U.S. Pat. Nos. 3,354,129 and 3,919,177. The presently preferred polymer is poly(phenylene sulfide), often abbreviated PPS. The term poly(arylene sulfide) includes homopolymers and normally solid arylene sulfide copolymers, terpolymers, and the like having melting or softening points of at least 300° F. (149° C.) and more preferably from about 400° F. to about 900° F. (200° C.–482° C.). Other examples of poly(arylene sulfides) are poly(4,4'-biphenylene sulfide); poly(2,4-toluene sulfide); copolymer of p-dichlorobenzene, 2,4-dichlorotoluene and sodium sulfide and the like. At present, the most preferred poly(arylene sulfide) for use in the invention is a poly(phenylene sulfide) that has a melt crystallization temperature (Tmc) in a range of about 150° C. to about 200° C., preferably about 160° C. to about 190° C. These polymers are especially applicable for use in the production of film and fiber.

The specific embodiments of the invention involving the use of extrusion of poly(phenylene sulfide) are applicable for the use of any type extruder provided, of course, there are controlled heating zones in the extrusion process such as in the feed hopper, the extruder barrel, the extruder nozzle, and the die. As will be noted below in the examples, the use of several heating zones within the length of the barrel of the extruder is a preferable arrangement.

Since the heart of the invention is the discovery of the critical temperature range of about 240° C. to about 320° C. through which the temperature of the polymer must be raised in no more than four minutes it is imperative that the heat exchange equipment used for passing heat into the polymer must supply a temperature sufficiently above this critical temperature range to heat the polymer rapidly and thoroughly. In one embodiment of the invention, this heat exchange equipment is located, preferably, to heat the barrel of the extruder near its inlet. In a further embodiment of this invention, as an aid for the rapid heating of the polymer within the extruder barrel, the extruder feed hopper is supplied with heat exchange means to allow the temperature of the polymer to be raised to the lower limit of the critical temperature range before entering the barrel of the extruder. In both of these embodiments, the object of the operation is to raise the temperature of the polymer through the critical range sufficiently rapidly to stabilize the Tmc.

In another embodiment of the invention, it is assumed that the polymer has been subjected to conditions of temperature rise which have allowed a modification of the Tmc. To correct the rise in the Tmc, the polymer is subjected to a temperature of at least 350° C. for a time sufficient to at least reduce and, preferably to eliminate, the increase in Tmc. The required period is quite short, usually within a range of about 0.1 minute to about 20 minutes, preferably within a range of about 1 minute to about 10 minutes. When this corrected temperature is attained within an extruder barrel it is only required that the temperature is not subsequently allowed to drop below the critical temperature and be raised through that critical range too slowly.

The following examples will serve to illustrate the invention. They should be taken as illustrative and not restrictive.

EXAMPLE I

This example demonstrates the effect a slow rate versus a fast rate of heating has on the melt crystallization temperature (Tmc) of PPS. To test the effect of fast versus slow heat-up rate, a small amount (about 7 milligrams) of PPS (flow rate 82 grams per 10 minutes as determined by the test method ASTM D 1238, Procedure B) which had a Tmc of 168° C. was placed in a Perkin-Elmer Differential Scanning Calorimeter, Model DSC-2C, which was connected to a Model 3500 Data Station. The sample was slowly heated at a rate of 5° C. per minute from about 50° C. to above the melt temperature of the sample (i.e. 360° C.). The sample was held at 360° C. for 5 minutes before cooling at a rate of 20° C./min. In this test an exotherm peak occurs which is referred to as the crystallinity peak or melt crystallization temperature (Tmc). With a heat-up rate of 5° C./min. it was indicated that the Tmc had increased from the original 168° C. to 212° C. The procedure was repeated using various heat-up rates. The results which are listed in Table I indicate that when a PPS polymer having a relatively low Tmc (i.e. 168° C.) is slowly heated at a rate below about 20° C. per minute, the Tmc of the polymer increases. Similarly, when the PPS polymer is heated at a faster rate, above about 20° C. per minute, the Tmc of the polymer remains essentially constant.

TABLE I

| Heating Rate Effect on Tmc of PPS Polymer (Original Tmc, 168° C.) | |
| --- | --- |
| Heating Rate, °C./min. | Tmc, °C. |
| 5 | 212 |

TABLE I-continued

| Heating Rate Effect on Tmc of PPS Polymer (Original Tmc, 168° C.) | |
| --- | --- |
| Heating Rate, °C./min. | Tmc, °C. |
| 10 | 202 |
| 15 | 197 |
| 20 | 169 |
| 40 | 169 |
| 80 | 171 |
| 160 | 166 |

EXAMPLE II

This example demonstrates that a slow heat-up rate, as shown in Example I, is particularly harmful in a critical temperature range between 240° C.–320° C. In this example the PPS sample was heated rapidly (i.e. 80° C.–100° C./min.) to a predetermined temperature, here chosen to be 240° C., and then slowly heated at a rate, such as 10° C./min., previously determined to increase Tmc. As listed in Table II, Runs 1 through 5 show that heating slowly above a temperature of about 320° C. does not significantly increase the Tmc but below 320° C. the Tmc progressively increases as the rate of temperature rise is decreased. These data indicate there is a critical temperature range between about 240° C. to 320° C. in which slow heating is harmful and suggests that a rapid increase of temperature through this range is necessary to maintain the original lower Tmc.

The experiment was repeated at two low rates of temperature increase, i.e. 10° C./min. and 5° C./min., with the additional step that upon reaching a temperature of 320° C. (the top of the so-called critical range) the sample was very rapidly heated to a temperature of 360 C. at a rate of 320° C./min. (see Runs 6 and 7). These results show Tmc held nearer to the original which suggests that an increase in Tmc can be nullified by a very fast heat-up rate above 320° C. at the end of the heat-up cycle even though the Tmc may have increased during a slow heat-up period.

TABLE II

| Effect of Slow Heating Rate Through a Reduced Temperature Range (Original Tmc, 168° C.) | | | |
| --- | --- | --- | --- |
| Run No. | Temp. Range, °C. Min. | Max. | Heating Rate, °C./min. | Tmc, °C. |
| 1 | 240 | 360 | 10 | 206 |
| 2 | 260 | 360 | 10 | 204 |
| 3 | 280 | 360 | 10 | 201 |
| 4 | 300 | 360 | 10 | 194 |
| 5 | 320 | 360 | 10 | 173 |
| 6 | 260 | 360 | 10 | 178[a] |
| 7 | 260 | 360 | 5 | 186[a] |

[a]Heated from 320° C. to 360° C. at 320° C./min.

EXAMPLE III

This is a calculated example in which the results from Examples I and II are applied to a typical PPS extruding operation. A PPS powder (flow rate 46 g/10 min., ash 0.4%, Tmc 168° C.) is dried for 5 hours at 350° F. (177° C.) in an oven. The powder is then fed at ambient temperature into a 1.5 inch Davis-Standard Extruder having four heating zones and a heated die plus a filter screen pack, 40/80/200X-13L/O-ring, at a screw speed of 35 rpm and an output of about 60 grams/minute. The data listed in Table III show that during a normal PPS extrusion wherein the PPS is fed into an extruder at ambient room temperature, 25° C., and allowed to heat to about 325° C. as it passes through the extruder results in an extrudate with a higher than desired Tmc (Run 1). However, pre-heating the PPS to 250° C. in a hopper followed by passage through the extruder in which the temperature in the first heating zone is considerably elevated (i.e. 400° C.) permits a faster heat-up rate for the PPS particularly through the critical temperature range of 240° C. to 320° C. and, thus, there is no change in the Tmc of the extrudate (Run 2). In still another theoretical run (Run 3), PPS is fed into the extruder in the same manner as the control (Run 1) except the temperature in the second and third heating zones is intentionally increased above the nozzle temperature. This again results in an extruded product in which an increase in Tmc is not exhibited.

TABLE III

Calculated Effect of Heating-Rate on Tmc of PPS During Extrusion

| Run No. | 1 | Invention 2 | 3 |
|---|---|---|---|
| Tmc of Extruder Feed, °C. | 168 | 168 | 168 |
| Hopper Temp., °C. | 25 | 250 | 25 |
| Extruder Temp., °C. | | | |
| Zone #1 | 325 | 400 | 325 |
| Zone #2 | 325 | 350 | 350 |
| Zone #3 | 325 | 325 | 380 |
| Zone #4 | 335 | 325 | 325 |
| Die Temp., °C. | 340 | 325 | 325 |
| Melt Temp., °C. | 335 | 335 | 325 |
| Tmc of Extrudate, °C. | 186 | 168 | 168 |

I claim:

1. A method for stabilizing the Tmc of PPS subjected to heat treatment in a range up to about 320° C., said method comprising heating said PPS at a rate of temperature increase in a range of at least 20° C. per minute in the range of temperature of between 240° C. and 320° C.

2. A method for stabilizing Tmc in PPS subjected to heat treatment in a range up to about 320° C., said method comprising maintaining the temperature of said PPS at a temperature above at least 350° C. for a time sufficient to stabilize the Tmc.

3. A method of claim 2 wherein said time of maintaining temperature above 350° C. is in a range of about 0.1 minutes to about 20 minutes.

4. A method for alleviating an increase of Tmc caused by heating PPS at a rate of temperature increase of less than about 20° C. per minute in the temperature range between 240° C. and 320° C. said method comprising maintaining the temperature of said polymer above about 350° C. for a time sufficient to stabilize the Tmc.

5. A method of claim 4 wherein said time of maintaining temperature above 350° C. is in a range of about 0.1 minutes to about 20 minutes.

6. In the extrusion of PPS at a temperature in a range of about 300° C. to about 360° C. a method for stabilizing the melt crystallization temperature of polymer exiting the extruder comprising maintaining the temperature of at least the inlet zone of said extruder at a temperature within a range sufficiently elevated to stabilize the Tmc of said PPS by the method of claim 1.

7. A method of claim 6 wherein said PPS is preheated in a preheating zone to a temperature in the range of about 220° C. to about 260° C. prior to entry into said inlet zone.

8. In the extrusion of PPS at a temperature in a range of about 300° C. to about 360° C. a method for stabilizing the melt crystallization temperature of polymer exiting the extruder comprising maintaining the temperature of at least one zone of said extruder by the method of claim 2.

9. A method of claim 8 wherein said time of maintaining temperature above 350° C. is in a range of about 0.1 minutes to about 20 minutes.

* * * * *